United States Patent
Gill (10) Patent No.: US 7,092,221 B2
(45) Date of Patent: Aug. 15, 2006

(54) TOP CPP GMR/TV WITH BACK END OF STRIPE PINNED BY INSULATING AFM

(75) Inventor: Hardayal Singh Gill, Palo Alto, CA (US)

(73) Assignee: Hitachi Global Storage Technologies Netherlands, B.V., Amsterday (NL)

( * ) Notice: Subject to any disclaimer, the term of this patent is extended or adjusted under 35 U.S.C. 154(b) by 380 days.

(21) Appl. No.: 10/735,214

(22) Filed: Dec. 12, 2003

(65) Prior Publication Data

US 2005/0128653 A1    Jun. 16, 2005

(51) Int. Cl.
*G11B 5/127* (2006.01)

(52) U.S. Cl. .............................. 360/324.11; 360/324.11
(58) Field of Classification Search .......... 360/324.11, 360/324.12, 324.2
See application file for complete search history.

(56) References Cited

U.S. PATENT DOCUMENTS

| | | | |
|---|---|---|---|
| 5,705,973 A | 1/1998 | Yuan et al. ................ 338/32 R |
| 5,793,207 A | 8/1998 | Gill ............................ 324/252 |
| 5,859,754 A | 1/1999 | Tong et al. | |
| 6,175,475 B1 | 1/2001 | Lin et al. ................ 360/324.11 |
| 6,219,212 B1* | 4/2001 | Gill et al. ................ 360/324.2 |
| 6,392,850 B1 | 5/2002 | Tong et al. ................. 360/315 |
| 6,504,689 B1* | 1/2003 | Gill et al. ................ 360/324.2 |
| 6,512,661 B1* | 1/2003 | Louis ..................... 360/324.12 |
| 6,538,856 B1* | 3/2003 | Gill ............................. 360/319 |
| 6,556,391 B1 | 4/2003 | Aoshima et al. ........ 360/324.12 |
| 6,597,546 B1* | 7/2003 | Gill ............................. 360/321 |
| 6,624,988 B1* | 9/2003 | Gill ......................... 360/324.2 |
| 6,757,144 B1* | 6/2004 | Carey et al. ............. 360/324.2 |
| 2002/0154452 A1* | 10/2002 | Gill ............................. 360/321 |
| 2003/0035249 A1* | 2/2003 | Ho et al. .................... 360/321 |
| 2004/0061979 A1* | 4/2004 | Ho et al. .................... 360/321 |
| 2005/0157436 A1* | 7/2005 | Gill ........................ 360/324.12 |

FOREIGN PATENT DOCUMENTS

JP    2000105912 A    4/2001

* cited by examiner

*Primary Examiner*—Allen Cao
(74) *Attorney, Agent, or Firm*—Larry B. Guernsey; Intellectual Property Law Offices (57) ABSTRACT

A magnetic head includes a read sensor having a primary stack, a secondary stack and an exchange layer. The primary stack includes one or more primary pinned layers having a top surface, a barrier layer, a free layer, and a seed layer. The secondary stack includes one or more layers of antiferromagnetic (AFM) material, and a secondary pinned layer, which is pinned by said AFM material. The secondary pinned layer has a top surface which is substantially level with the top surface of the primary pinned layer. An exchange layer contacts the top surface of the secondary pinned layer and is pinned thereby, and also contacts the top surface of the primary pinned layer and acts to pin the primary pinned layers. The secondary stack is removed from the ABS, but is in proximity to the primary stack.

30 Claims, 8 Drawing Sheets

TOP CPP GMR/TV WITH BACK END OF STRIPE PINNED BY INSULATING AFM

BACKGROUND OF THE INVENTION

1. Field of the Invention

The present invention relates generally to read heads for magnetic data storage mediums, and more particularly to a read head sensor using antiferromagnetic material to fix pinned layers in the sensor.

2. Description of the Prior Art

A computer disk drive stores and retrieves data by positioning a magnetic read/write head over a rotating magnetic data storage disk. The head, or heads, which are typically arranged in stacks, read from or write data to concentric data tracks defined on surface of the disks which are also typically arranged in stacks. The heads are included in structures called "sliders" into which the read/write sensors are imbedded during fabrication. The heads fly above the surface of the disks on a thin cushion of air, and the surface of the heads which face the disks is called an Air Bearing Surface (ABS).

The major goal in recent years is to increase the amount of data that can be stored on each hard disk. If data tracks can be made narrower, more tracks will fit on a disk surface, and more data can be stored on a given disk. The width of the tracks depends on the width of the read/write head used, and in recent years, track widths have decreased as the size of read/write heads have become progressively smaller. This decrease in track width has allowed for dramatic increases in the recording density and data storage of disks.

Recent read heads typically use a tunnel junction sensor for reading the magnetic field signals from the rotating magnetic data storage disk. The sensor typically includes a nonmagnetic tunneling barrier layer sandwiched between a ferromagnetic pinned layer and a ferromagnetic free layer. The pinned layer in turn is typically fabricated on or beneath an antiferromagnetic (AFM) pinning layer which fixes the magnetic moment of the pinned layer at an angle of 90 degrees to the air bearing surface (ABS). The tunnel junction sensor is itself typically sandwiched between ferromagnetic first and second shield layers. These first and second shield layers also serve as first and second leads, and are connected to the tunnel junction sensor for conducting a tunneling current through it. The tunneling current is preferably configured to Current Perpendicular to the Planes (CPP) of the film layers of the sensor, as opposed to a sensor where a sense Current In the Planes (CIP) or parallel to film layers of the spin valve sensor. The CPP configuration is attracting more attention lately, as it can be made to be more sensitive than the CIP configuration, and thus is more useful in higher densities of tracks and data.

AFM material used to fix the orientation of the pinned layer must be in close proximity to the pinned layer and is typically fabricated on top or beneath the pinned layer. The AFM material thus contributes to the overall height of the stack of layers, and thus to the overall height dimension of the read sensor. This contribution can be substantial, as it is not uncommon for the AFM material to be as thick as the other layers combined. As discussed above, the quest in disk drive head manufacture is for reduced size. Thus, a configuration which reduces the overall thickness of the sensor by repositioning the AFM material would have significant advantages.

Also as discussed above, CPP configurations are becoming more favored for their increased sensitivity. This configuration requires that electric current be conducted through every layer of the stack. The AFM material which is included in the typical stack must therefore necessarily be conductive. However, resistance in the materials generally causes them to heat as they conduct. This heat can cause variation in the magnetic properties of AFM materials, and thus also in the pinned layer. If the AFM material were removed from the conduction path, and made of insulating materials, overall stability would be improved.

Thus there is a need for an improved configuration of read head sensor which has reduced overall dimensions, and improved stability of its magnetic properties.

SUMMARY OF THE INVENTION

A preferred embodiment of the present invention is a magnetic head having as one surface an air bearing surface (ABS). The magnetic head includes a read sensor having a primary stack, a secondary stack and an exchange layer. The primary stack includes one or more primary pinned layers, the uppermost of these primary pinned layers having a top surface which lies perpendicular to the ABS. The primary stack also includes a barrier layer, a free layer, and a seed layer. The secondary stack includes one or more layers of antiferromagnetic (AFM) material, and a secondary pinned layer, which is pinned by the AFM material. This secondary pinned layer has a top surface which also lies perpendicular to the ABS and which is substantially level with the top surface of the primary pinned layer. An exchange layer contacts the top surface of the secondary pinned layer and is pinned by the secondary pinned layer, and also contacts the top surface of the primary pinned layer and acts to pin the primary pinned layers. The primary stack has a side which forms part of the ABS. The secondary stack is removed from the ABS, but is in proximity with the primary stack.

The present invention also includes a disk drive including the magnetic head and a method of fabrication of the read sensor.

It is an advantage of the present invention that the stack height of the read sensor is reduced.

It is a further advantage of the present invention that the antiferromagnetic (AFM) material is placed in a secondary stack and can be made of insulating material, which better directs the current flow through the primary stack.

It is another advantage of the present invention that by restricting current flow away from the AFM materials, these materials heat less, which enhances the stability of their magnetic properties, and thus also of the pinned layers.

It is yet another advantage of the present invention that by removing the AFM materials from the air-bearing surface (ABS), the ABS can be made smoother with fewer processing steps.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

DETAILED DESCRIPTION OF THE PREFERRED EMBODIMENTS

Figure 1:
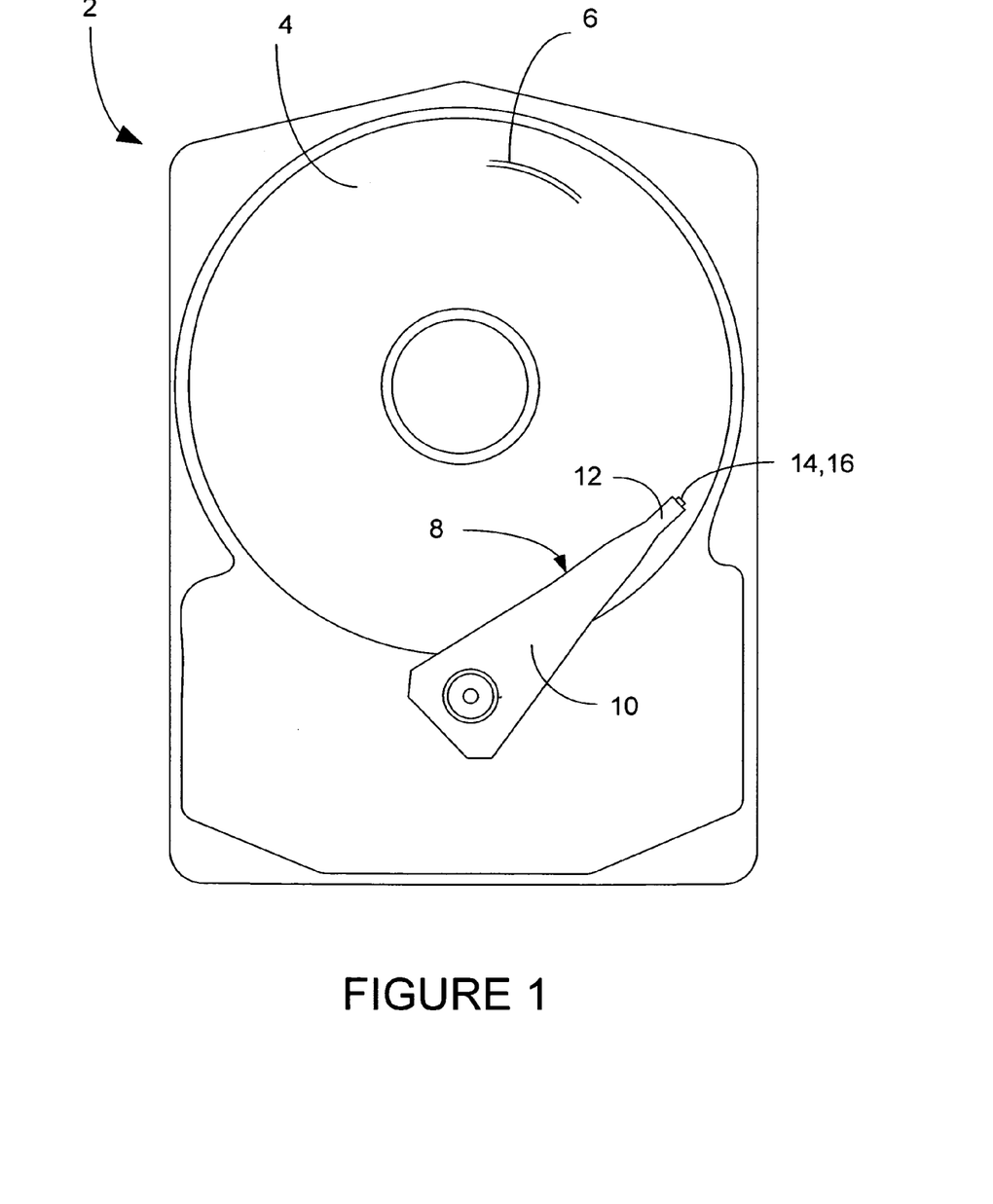
FIG. 1 shows a top plan view of an exemplary disk drive.

A magnetic disk drive 2 is shown generally in FIG. 1, having one or more magnetic data storage disks 4, with data tracks 6 which are written and read by a data read/write device 8. The data read/write device 8 includes an actuator arm 10, and a suspension 12 which supports one or more magnetic heads 14 included in one or more sliders 16.

Figure 2:
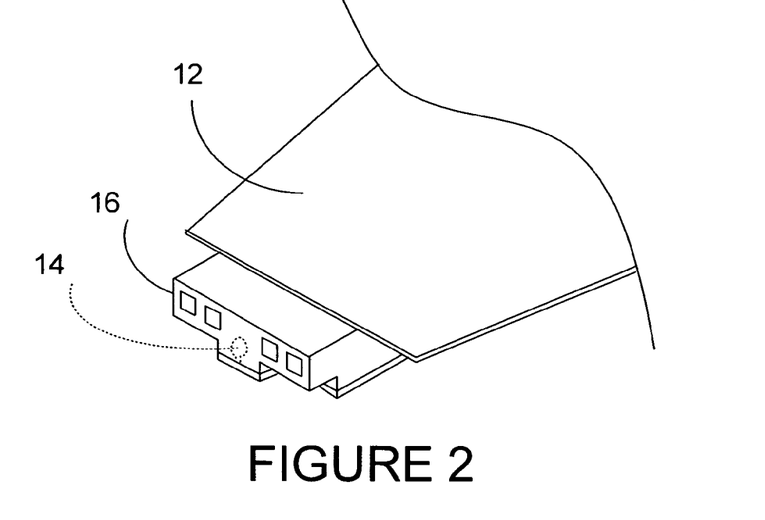
FIG. 2 illustrates a perspective view of view of an exemplary slider and suspension.

FIG. 2 shows a slider 16 in more detail being supported by suspension 12. The magnetic head 14 is shown in dashed lines, and in more detail in FIG. 3. The magnetic head 14 includes a coil 18 and poles 20 having tips 22. The magnetic head 14 flies on an air cushion between the surface of the disk 4 and the air bearing surface (ABS) 24 of the slider 16.

Figure 3:
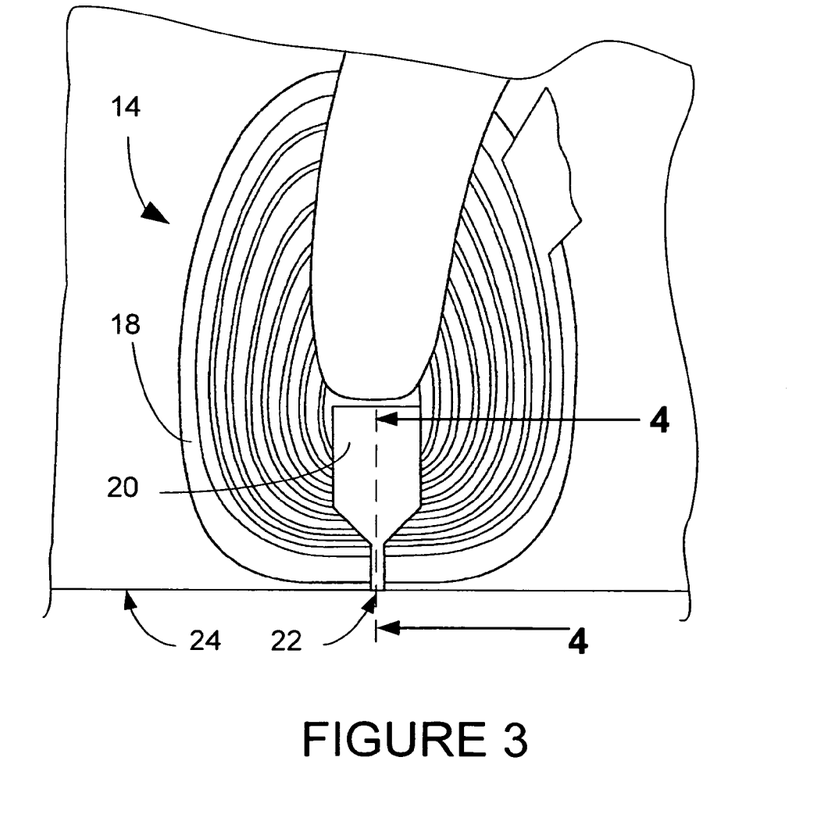
FIG. 3 shows a top plan view of an exemplary read/write head.
Figure 4:
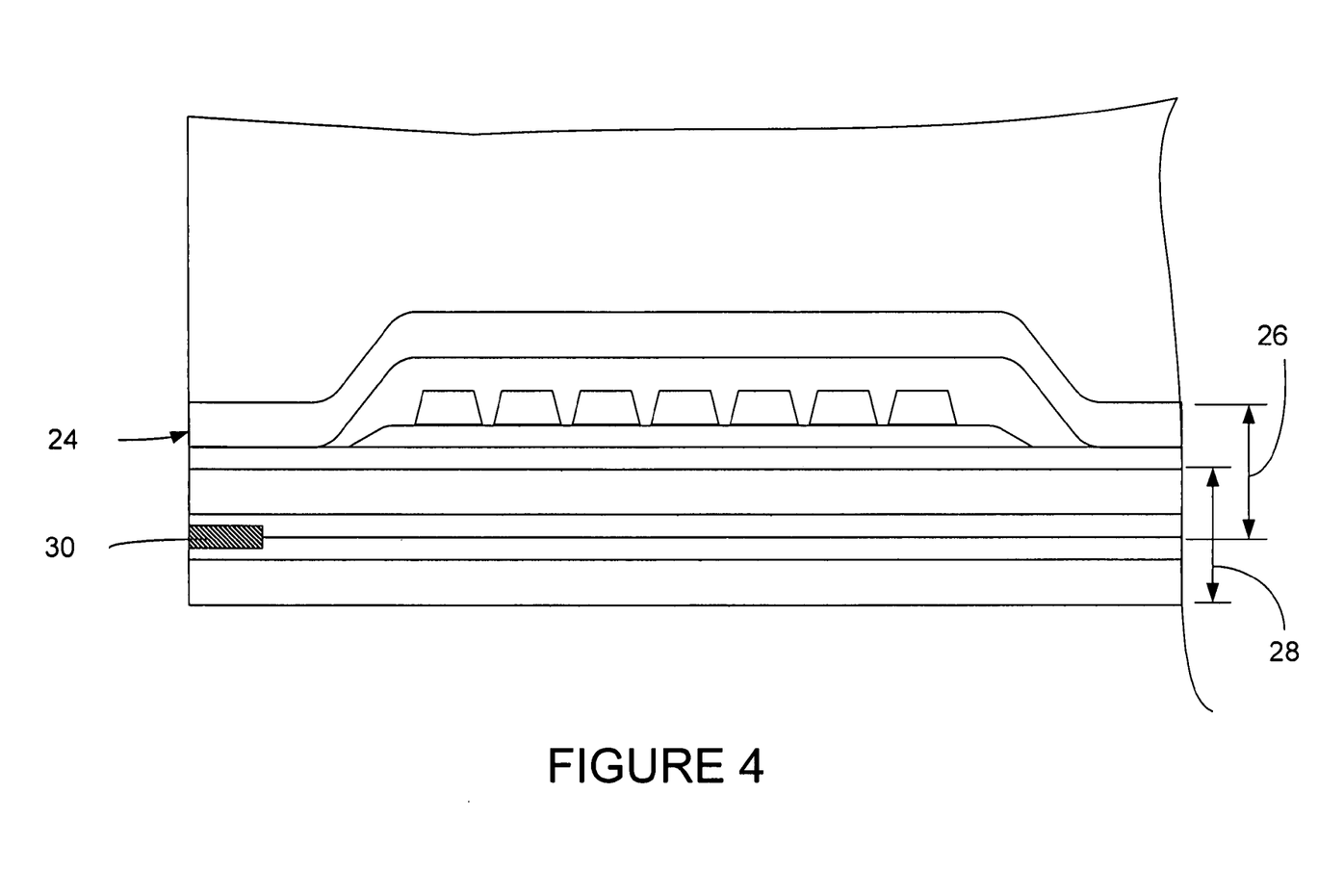
FIG. 4 is a cross-section view of an exemplary read/write head as taken through plane 4—4 of FIG. 3.

FIG. 4 is a cut-away view of the magnetic head 14 structure as taken from line 4—4 of FIG. 3. The write head portion 26 and the read head portion 28 are generally shown, with the read head sensor 30 and the ABS 24.

The magnetic head 14 preferably includes a sensor 30 of a type that is known as a Top CPP, (see FIG. 6, prior art) meaning that the pinned layers 34 are fabricated above the free layer 36, and the sensor is configured so that the Current is Perpendicular to the Plane (CPP). As discussed above, this is in contrast to a sensor where a sense Current is conducted In the Planes (CIP) or parallel to film layers of the spin valve sensor. The CPP configuration can be made to be more sensitive than the CIP configuration, and thus is more useful in higher densities of tracks and data.

Figure 6:
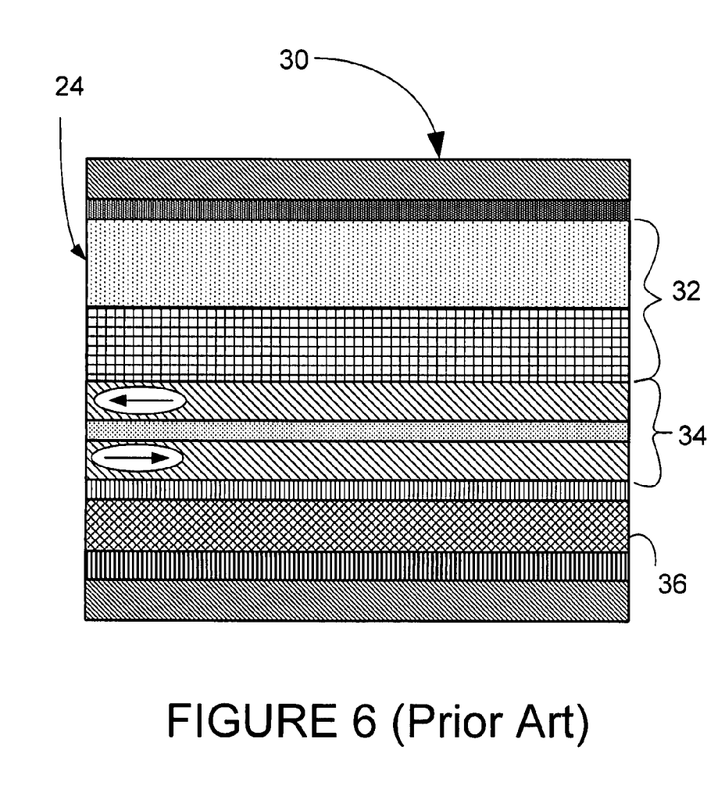
FIG. 6 illustrates a side plan view of a read sensor of the prior art.

In the prior art configuration of a Top CPP, one or more layers of antiferromagnetic (AFM) material 32 are provided on top of the pinned layers 34 as shown in FIG. 6, prior art. It is this AFM material 32 that is used in fixing the orientation of the pinned layers 34, and generally this orientation is fixed to be perpendicular to the Air Bearing Surface (ABS), as shown by the arrows. The dimension and composition of the stack of films is an object of constant refinement, as the size of the read head is sought to be reduced. The AFM layer 32 contributes substantially to the overall stack height, and it while no attempt has been made in the figures to make the relative dimensions of the layers to scale, it is not uncommon for the AFM layer or layers to be as thick as the rest of the film stack materials combined.

Figure 5:
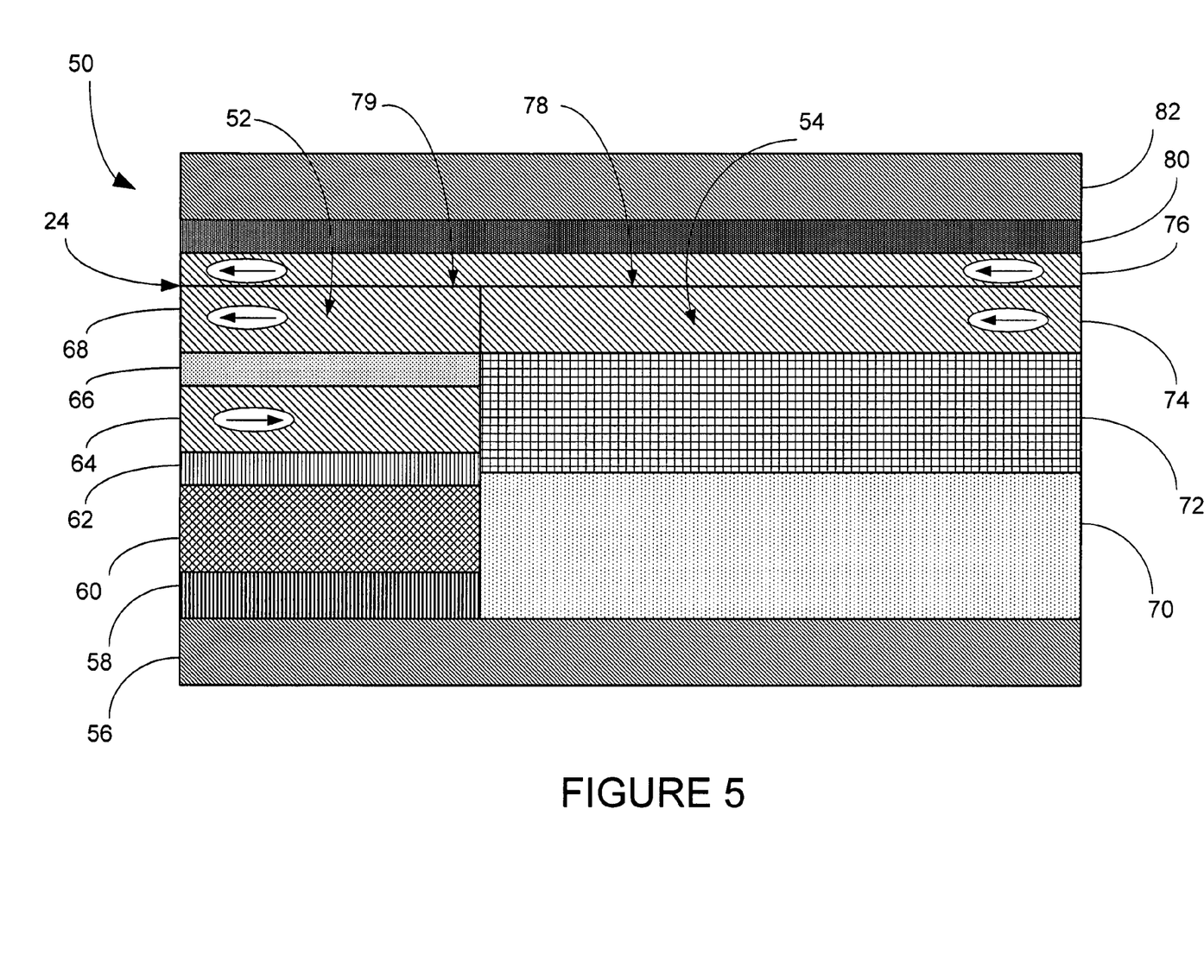
FIG. 5 shows a side plan view of the read sensor of the present invention.

Thus, there is a drive to reduce the dimensions of the AFM layer, but there are certain practical lower limits on the amount of material that must be present in order to effectively fix the pinned layer materials. The present invention solves this problem by moving the AFM material to a secondary stack 54, while the pinned layers 64, 68 remain part of the primary stack 52 as shown in FIG. 5.

The structure of the sensor 50 includes a first shield layer 56 upon which the primary stack 52 and secondary stack 54 are built. The primary stack 52 includes a seed layer 58, a free layer 60, a barrier layer 62, preferably of Cu, $Al_2O_3$, or $MgO_2$, a lower pinned layer 64, preferably of CoFe, a spacer layer 66, preferably of Ru, and an upper pinned layer 68, also preferably of CoFe.

The secondary stack 54 includes a first AFM layer 70, preferably of Alpha-$Fe_2O_3$, and a second AFM layer 72, preferably of NiO, CoO, or NiO/CoO topped by a secondary pinned layer 74, also of CoFe, whose top surface 78 is preferably roughly level with the top surface 79 of the upper pinned layer 68 of the primary stack 52. An exchange layer 76 contacts the top surface 78 of the secondary pinned layer 74, and the top surface 79 of the upper pinned layer 68. This exchange layer 76 is also preferably of CoFe, which is important in the pinning of both pinned layers 64, 68, as will be discussed below. This is topped with a cap layer 80, preferably of Ta, and then the second shield layer 82.

The purpose of the antiferromagnetic (AFM) pinning layers 70, 72 is to fix the magnetic moment of the pinned layers at an angle of 90 degrees to the air bearing surface (ABS) 24, as shown by the arrows. The AFM layers 70, 72 pin the secondary pinned layer 74, which is adjacent to the upper pinned layer 68 of the primary stack 52, but the pinning effect of the secondary pinned layer 74 does not transfer across the boundary between the stacks 52, 54 well, so that the upper pinned layer 68 of the primary stack 52 is not effectively pinned. The exchange layer 76 contacts the top surface 78 of the secondary pinned layer 74, and the pinning effect across the boundary between these two layers 74, 76 is very effective, and the exchange layer 76 is effectively pinned. The exchange layer also contacts the top surface 79 of the upper pinned layer 68 of the primary stack 52. This pinning effect is then transferred across this boundary, so that the upper pinned layer 68 of the primary stack 52 is pinned, and this effect also is transferred to the lower pinned layer 64 of the primary stack 52.

Figure 7:
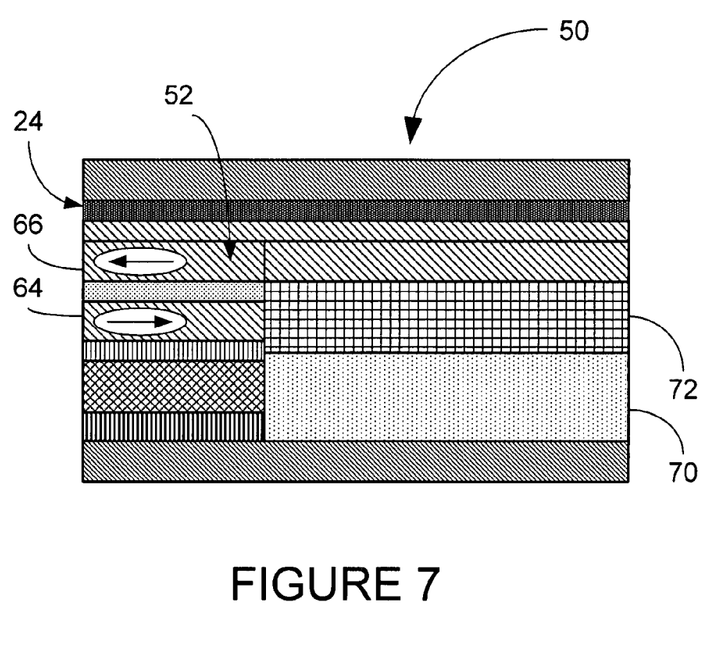
FIG. 7 shows a side plan view of the read sensor of the present invention, presented for comparison with the prior art sensor of FIG. 6.

This configuration of the present invention has several advantages. As discussed above, the height dimension of the read sensor 30 at the ABS 24 is reduced, allowing the overall size to be smaller. FIGS. 6 (Prior Art) and 7 show a comparison of the differences in the prior art single stack sensor 30 and the present invention 50, having a lower pinned layer 64, and a upper pinned layer 68, and the AFM layers 70, 72 removed from the ABS 24, but still in proximity to the primary stack 52.

This type of read sensor is preferably configured to Conduct Perpendicular to the Planes (CPP), as opposed to a sensor where a sense current is Conducted In the Planes (CIP) or parallel to film layers of the spin valve sensor. The CPP sensor can be made to be more sensitive than the CIP configuration, and thus is more useful in higher densities of tracks and data. The current is thus directed in the vertical direction, and in the prior art, see FIG. 6, this meant that it must pass through the AFM layers as well, so the AFM material must necessarily be made of conducting material.

In the present invention 50, the AFM material 70, 72 is placed in a secondary stack 54, which is out of the current path, and can be made of insulating material, which better directs the current flow through the primary stack 52. Since the AFM material 70, 72 is not part of the conduction path, it does not heat as much, and has fewer fluctuations in temperature. A more stable temperature means that the magnetic properties are more stable, and thus the sensor 50 as a whole is more stable.

It is very important that the air bearing surface (ABS) 24 of the sensor be very smooth so that it flies well and does not in interfere with small bumps on the disk. Smoothing the ABS becomes more complicated as more layers of different material are included. Materials respond to different processes differently and have varying milling rates or reaction rates to CMP processes. Thus, by removing the AFM layers 70, 72 from the ABS, fewer layers are present and fewer types of materials need to be smoothed together. Thus, another advantage of the present invention 50 is that the ABS can be made smooth more easily with fewer processing steps. This reduces processing time and cost.

Figure 8:
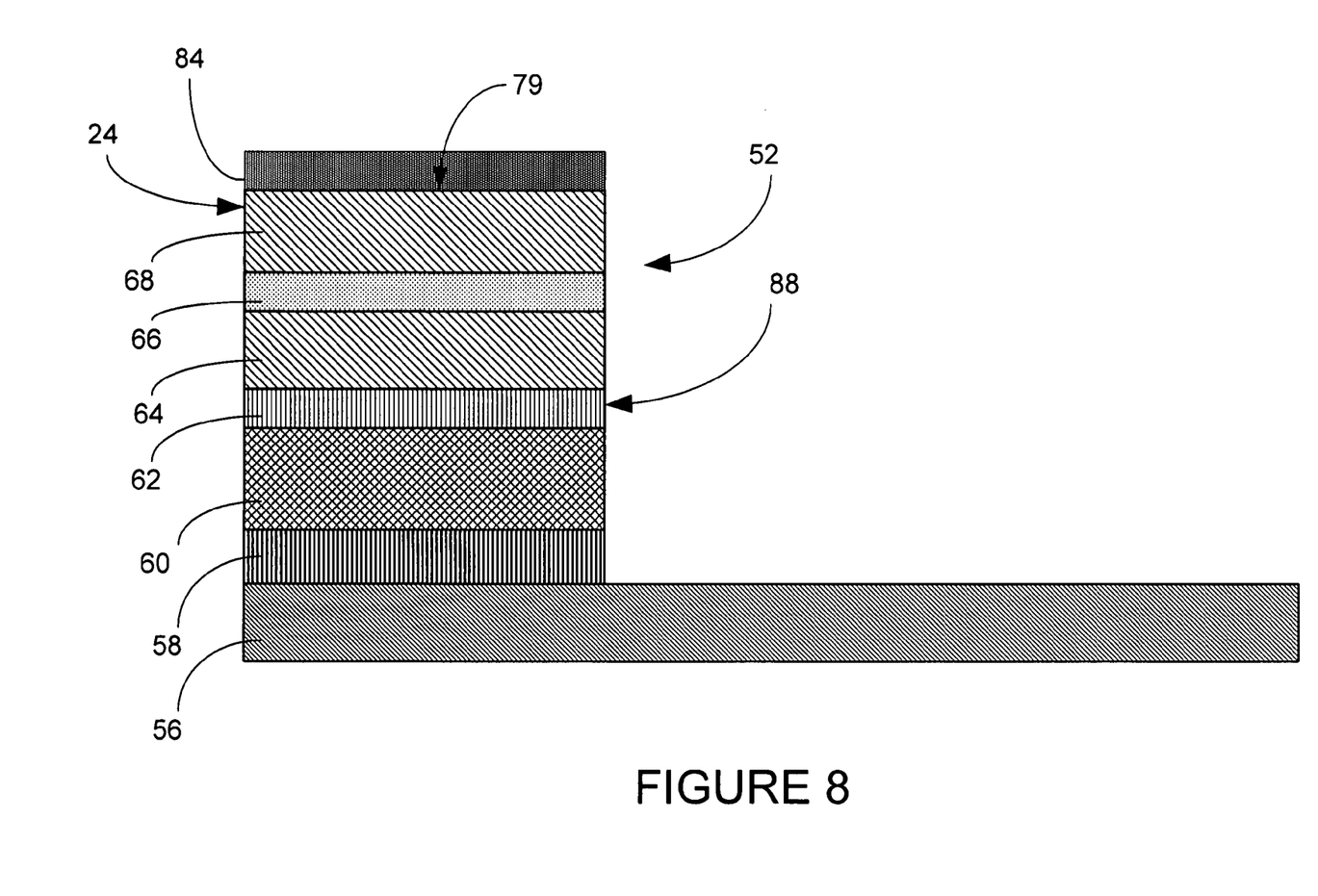
FIGS. 8–10 illustrate stages in the fabrication of the read sensor of the present invention.
Figure 9:
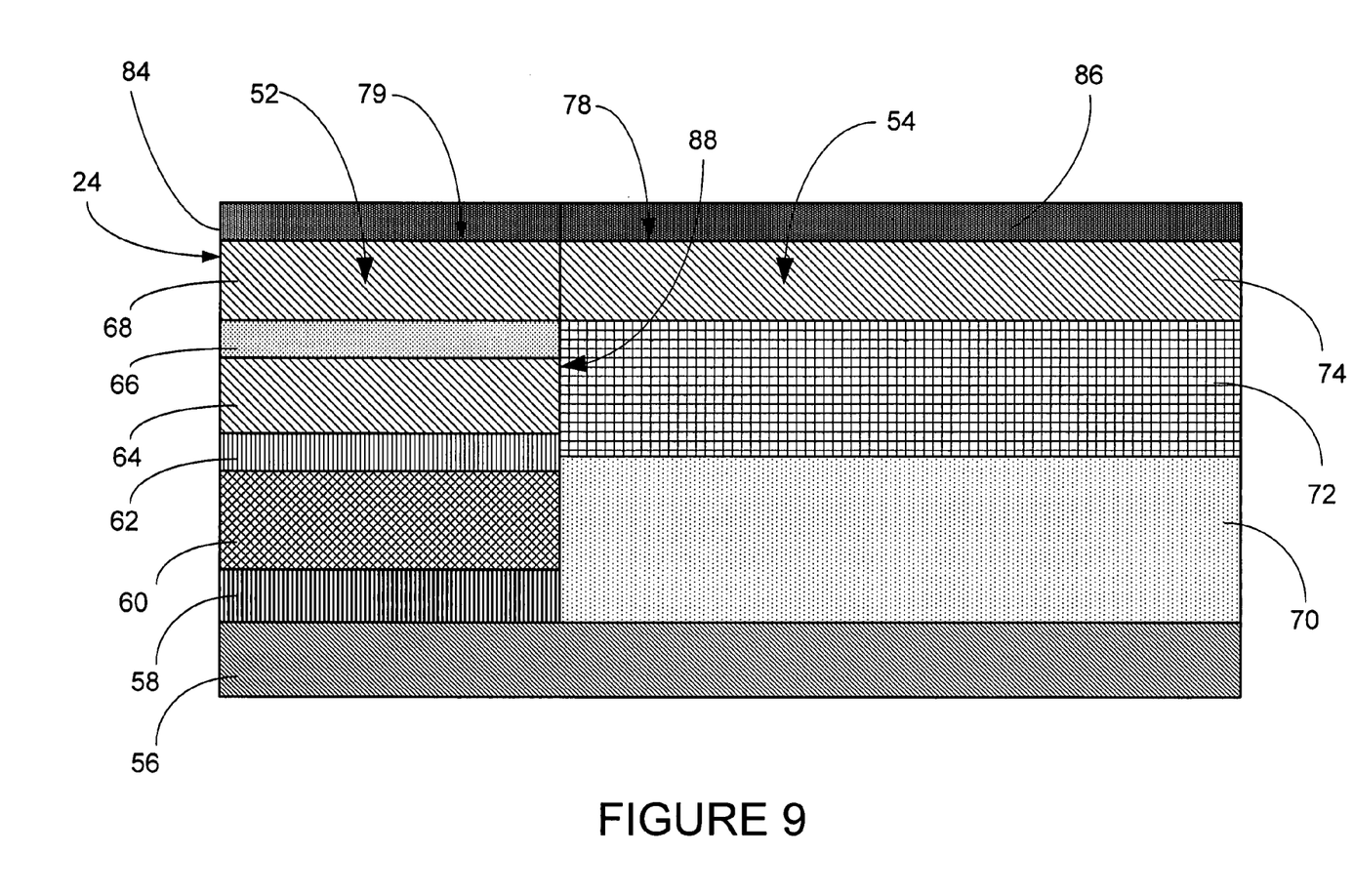
Figure 10:
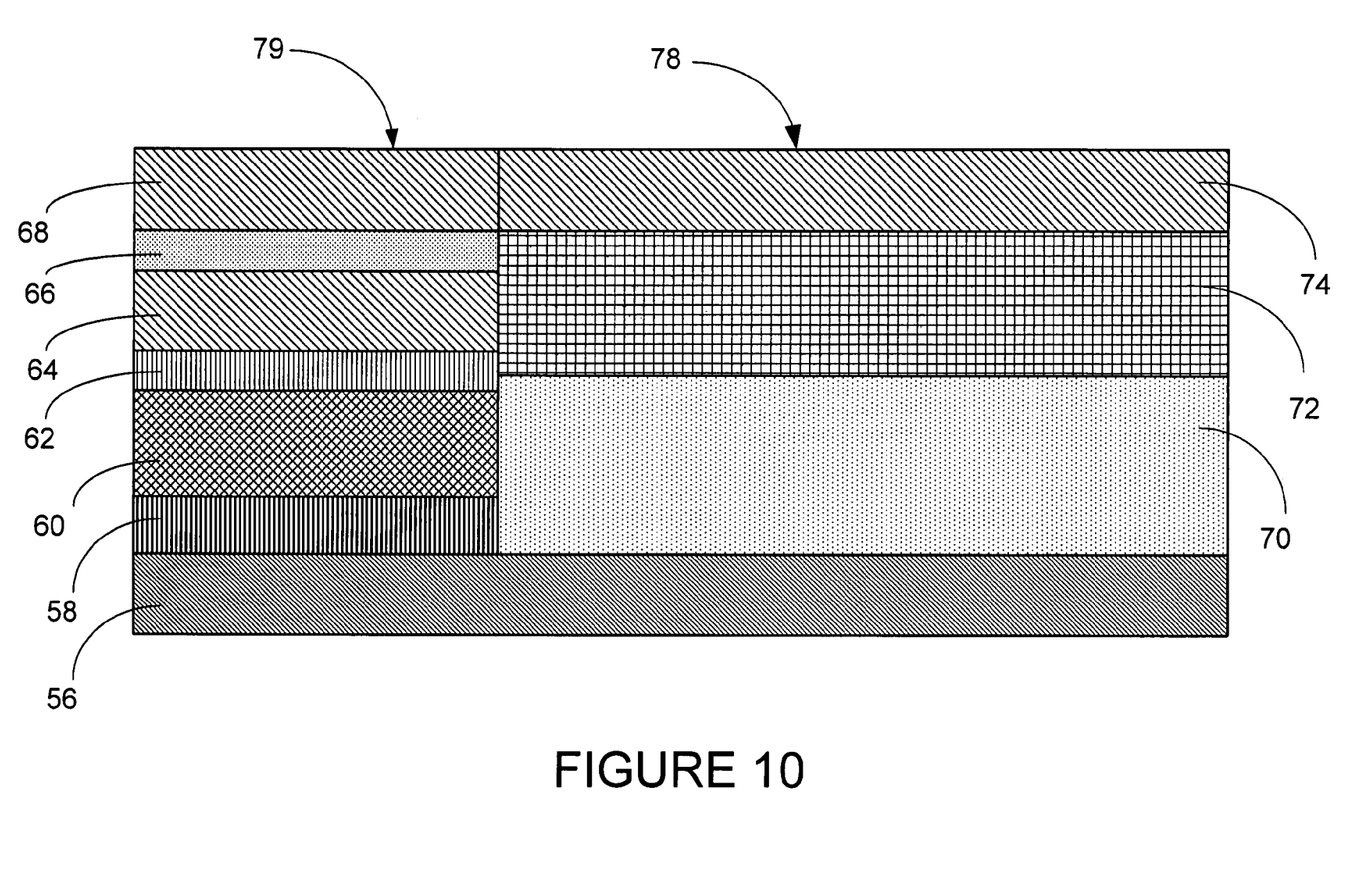

The steps in fabrication of the read sensor 50 are shown in FIGS. 8–10, which also show cross-section views of the sensor with the ABS 24 as the left hand boundary of the layers.

In FIG. 8, the first shield layer 56 is produced and the seed layer 58, free layer 60, barrier layer 62, lower pinned layer 64, spacer layer 66, and upper pinned layer 68, are deposited. The back end 88 of these layers are defined by ion-milling with an etch-stop in the first shield layer 56. The primary stack 52 is thus prepared and a temporary cap layer 84, preferably of Ta, is produced to protect the top surface 79 of the upper pinned layer 68.

FIG. 9 shows the secondary stack 54 being formed by CMP lift-off process, in which the first AFM layer 70, the second AFM layer 72, and secondary pinned layer 74 are deposited at the back end 88 of the primary stack 52. A secondary temporary cap layer 86, again preferably of Ta, is produced to protect the top surface 78 of the secondary pinned layer 74.

FIG. 10 shows that the temporary cap layer 84 and the secondary temporary cap layer 86 (see FIG. 9) are removed by the Reactive Ion Etching (RIE) process, leaving the top surfaces 78, 79 of the secondary pinned layer 74, and the upper pinned layer 68 exposed and ready for deposition of the exchange layer.

The exchange layer 76 and the cap layer 80 are then deposited, followed by the second shield layer 82 to produce the completed structure as shown in FIG. 5.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

What is claimed is:

1. A magnetic head having an air bearing surface (ABS), the magnetic head comprising:
    a read sensor including:
        a primary stack including:
            at least one primary pinned layer having a top surface;
            a barrier layer;
            a free layer;
            a seed layer; and
        a secondary stack including:
            at least one layer of antiferromagnetic (AFM) material; and
            a secondary pinned layer, which is pinned by said at least one layer of AFM material and which has a top surface which is substantially level with said top surface of said at least one primary pinned layer; and
            an exchange layer which contacts said top surface of said secondary pinned layer and is pinned by said secondary pinned layer, and which contacts said top surface of said at least one primary pinned layer of said primary stack and acts to pin said at least one primary pinned layer;
            where said primary stack has a side which forms part of said ABS, and said secondary stack is removed from said ABS.

2. The magnetic head of claim 1, wherein:
    said at least one primary pinned layer includes a pair of primary pinned layers, separated by a spacer layer.
3. The magnetic head of claim 1, wherein:
    said read head is of Top configuration.
4. The magnetic head of claim 1, wherein:
    said at least one layer of AFM includes two layers.
5. The magnetic head of claim 1, wherein:
    said at least one layer of AFM is composed of material which is electrically insulating.
6. The magnetic head of claim 1, wherein:
    said at least one layer of antiferromagnetic material is chosen from a group consisting of alpha $Fe_2O_3$, NiO, CoO, and NiO/CoO.
7. The magnetic head of claim 1, wherein:
    said at least one layer of antiferromagnetic material is one layer of alpha $Fe_2O_3$, and one layer of NiO.
8. The magnetic head of claim 1, wherein:
    said read sensor is of Current Perpendicular to the Plane (CPP) configuration.
9. A disk drive comprising:
    at least one hard disk;
    at least one magnetic head adapted to fly over said hard disk for writing data on said hard disk, and having an air bearing surface, said magnetic head including:
        a read sensor including:
            a primary stack including:
                at least one primary pinned layer having a top surface;
                a barrier layer;
                a free layer;
                a seed layer; and
            a secondary stack including:
                at least one layer of antiferromagnetic (AFM) material; and
                a secondary pinned layer, which is pinned by said at least one layer of AFM material and which has a top surface which is substantially level with said top surface of said at least one primary pinned layer; and
                an exchange layer which contacts said top surface of said secondary pinned layer and is pinned by said secondary pinned layer, and which contacts said top surface of said at least one primary pinned layer of said primary stack and acts to pin said at least one primary pinned layer;
                where said primary stack has a side which forms part of said ABS, and said secondary stack is removed from said ABS.
10. The disk drive of claim 9, wherein:
    said at least one primary pinned layer is a pair of primary pinned layers, separated by a spacer layer.
11. The disk drive of claim 9, wherein:
    said read head is of Top configuration.
12. The disk drive of claim 9, wherein:
    said at least one layer of AFM includes two layers.
13. The disk drive of claim 9, wherein:
    said at least one layer of AFM is composed of material which is electrically insulating.
14. The disk drive of claim 9, wherein:
    said at least one layer of antiferromagnetic material is chosen from a group consisting of alpha $Fe_2O_3$, NiO, CoO, and CoO/NiO.
15. The disk drive claim 9, wherein:
    said at least one layer of antiferromagnetic material is one layer of alpha $Fe_2O_3$, and one layer of NiO.

16. The disk drive of claim 9, wherein:
said read head is of Current Perpendicular to the Plane (CPP) configuration.

17. A method of fabrication of a read head sensor, comprising:
   A) fabricating a primary stack, including at least one primary pinned layer, said primary stack having an air bearing surface and a back end opposite said air bearing surface, said at least one primary pinned layer having a top surface;
   B) fabricating a secondary stack including at least one layer of antiferromagnetic material, and a secondary pinned layer having a top surface; and
   C) fabricating an exchange layer which contacts said top surfaces of said primary pinned layer and said secondary pinned layer.

18. The method of fabrication of claim 17, wherein:
said secondary stack is fabricated in close proximity to said back end of said primary stack.

19. The method of fabrication of claim 17, further comprising:
   D) fabricating a cap layer upon said exchange layer.

20. The method of fabrication of claim 17, wherein:
said at least one pinned layer includes a pair of pinned layers.

21. The method of fabrication of claim 17, wherein said primary stack comprises:
   a seed layer;
   a free layer;
   a barrier layer;
   a lower primary pinned layer;
   a spacer layer; and
   an upper primary pinned layer.

22. The method of fabrication of claim 17, wherein A further comprises:
fabricating a first shield layer upon which said primary stack is fabricated.

23. The method of fabrication of claim 22, wherein:
said back end of said primary stack is fabricated in A by ion-milling said layers of said primary stack with an etch-stop at said first shield layer.

24. The method of fabrication of claim 17, wherein A further comprises:
fabricating a temporary primary cap layer on said top surface of said primary pinned layer.

25. The method of fabrication of claim 23, wherein:
said secondary stack is fabricated in B by using a CMP lift-off process to deposit said at least one layer of antiferromagnetic material, and a secondary pinned layer at said back end of said primary stack.

26. The method of fabrication of claim 24, wherein B further comprises:
fabricating a temporary secondary cap layer on said top surface of said secondary pinned layer.

27. The method of fabrication of claim 26, wherein C further comprises:
removing said temporary primary and secondary cap layers on said top surfaces of said primary and secondary pinned layers before depositing said exchange layer.

28. The method of fabrication of claim 17, wherein:
said at least one layer of antiferromagnetic material is made of material that is electrically insulating.

29. The method of fabrication of claim 17, wherein:
said at least one layer of antiferromagnetic material is chosen from a group consisting of alpha $Fe_2O_3$, NiO, CoO, and NiO/CoO.

30. The method of fabrication of claim 17, wherein:
said at least one layer of antiferromagnetic material is one layer of alpha $Fe_2O_3$, and one layer of NiO.

* * * * *